US009744810B2

(12) United States Patent
Sueno

(10) Patent No.: US 9,744,810 B2
(45) Date of Patent: Aug. 29, 2017

(54) PNEUMATIC TIRE

(71) Applicant: SUMITOMO RUBBER INDUSTRIES, LTD., Kobe-shi (JP)

(72) Inventor: Junya Sueno, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 450 days.

(21) Appl. No.: 14/225,595

(22) Filed: Mar. 26, 2014

(65) Prior Publication Data
US 2014/0305564 A1    Oct. 16, 2014

(30) Foreign Application Priority Data

Apr. 12, 2013   (JP) .................................. 2013-084140

(51) Int. Cl.
*B60C 11/03*    (2006.01)
*B60C 11/12*    (2006.01)

(52) U.S. Cl.
CPC ...... *B60C 11/0306* (2013.01); *B60C 11/0304* (2013.04); *B60C 11/1236* (2013.04); *B60C 2011/036* (2013.04); *B60C 2011/0348* (2013.04); *B60C 2011/0351* (2013.04); *B60C 2011/0369* (2013.04); *B60C 2011/0381* (2013.04); *B60C 2011/0393* (2013.04); *B60C 2011/1209* (2013.04)

(58) Field of Classification Search
CPC ......... B60C 11/0304; B60C 2011/0348; B60C 2011/0369; B60C 2011/0395
See application file for complete search history.

(56) References Cited

U.S. PATENT DOCUMENTS

| 5,152,852 | A | * | 10/1992 | Hisamichi | ........... | B60C 11/0304 |
| | | | | | | 152/209.28 |
| 5,526,860 | A | * | 6/1996 | Minami | .............. | B60C 11/0306 |
| | | | | | | 152/209.18 |
| D610,068 | S | * | 2/2010 | Nagata | ......................... | D12/518 |
| 2005/0121123 | A1 | * | 6/2005 | Nakagawa | .......... | B60C 11/0306 |
| | | | | | | 152/209.9 |

FOREIGN PATENT DOCUMENTS

JP    2005-170147    6/2005

* cited by examiner

*Primary Examiner* — Steven D Maki
(74) *Attorney, Agent, or Firm* — Oblon, McClelland, Maier & Neustadt, L.L.P.

(57) ABSTRACT

A pneumatic tire includes a tread having a center main groove and a pair of shoulder main grooves. A pair of middle land sections in the tread is positioned between the shoulder and center grooves. Each of the shoulder and center grooves has a groove width set in range of 7 to 9% of width of the tread footprint. An outer middle land portion is divided into first and second middle land portions by a middle narrow groove. The first land portion forms rib. The second land portion has outer middle lateral grooves connected to the center groove and the narrow groove. Each lateral groove includes first portion, second portion having the opposite inclination to the first portion and connection portion between the first and second portions. The connection portion is positioned on the center groove side from the center of the outer land portion in the axial direction.

20 Claims, 7 Drawing Sheets

PNEUMATIC TIRE

CROSS-REFERENCE TO RELATED APPLICATIONS

The present application is based upon and claims the benefit of priority to Japanese Patent Application No. 2013-084140, filed Apr. 12, 2013, the entire contents of which are incorporated herein by reference.

BACKGROUND OF THE INVENTION

1. Field of the Invention

The present invention relates to a pneumatic tire that exhibits excellent noise performance while maintaining wet performance.

2. Description of Background Art

For example, Japanese Published Unexamined Patent Application 2005-170147 proposes a pneumatic tire in which a shoulder land section and a middle land section are structured to have predetermined rigidity. The entire contents of this publication are incorporated herein by reference.

SUMMARY OF THE INVENTION

According to one aspect of the present invention, a pneumatic tire includes a tread having a center main groove and a pair of shoulder main grooves, the shoulder main grooves extending continuously in a tire circumferential direction such that the shoulder main grooves are positioned one on each side of a tire equator in a tread footprint, respectively, the center main groove extending continuously in the tire circumferential direction between the shoulder main grooves. The tread has a pair of middle land sections formed between the center main groove and the pair of shoulder main grooves such that the middle land sections are positioned between the shoulder main grooves and the center main groove, respectively. Each of the shoulder main grooves and center main groove has a groove width set in a range of 7 to 9% of a width of the tread footprint. The middle land sections include an outer middle land portion divided by a middle narrow groove into a first outer middle land portion on an outer side in a tire axial direction with respect to a vehicle when the pneumatic tire is mounted on the vehicle and a second outer middle land portion on an inner side in the tire axial direction with respect to the vehicle, the middle narrow groove is extending continuously in the tire circumferential direction and has a groove width smaller than the groove width of each of the shoulder main grooves. The first outer middle land portion forms a rib extending continuously in the tire circumferential direction. The second outer middle land portion has outer middle lateral grooves each connected to the center main groove and the middle narrow groove. Each of the outer middle lateral grooves includes a first portion having an inclination to the tire axial direction, a second portion having the opposite inclination to the inclination of the first portion, and a connection portion between the first portion and the second portion. The connection portion is positioned on a center main groove side with respect to the center point of the outer middle land portion in the tire axial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
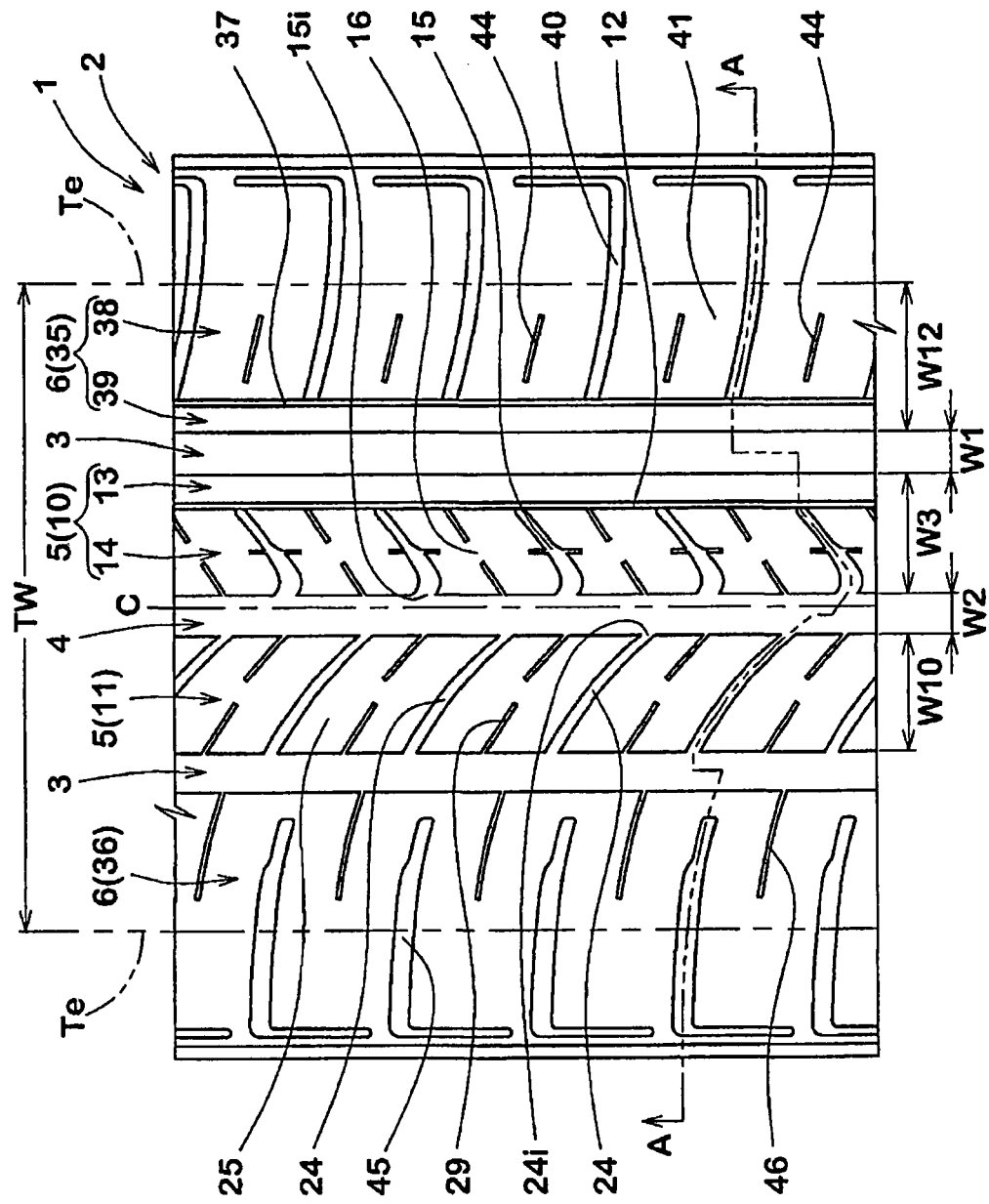
FIG. 1 is a developed view of the tread of a pneumatic tire according to an embodiment of the present invention.

The embodiments will now be described with reference to the accompanying drawings, wherein like reference numerals designate corresponding or identical elements throughout the various drawings.

As shown in FIG. 1, pneumatic tire 1 according to an embodiment of the present invention (hereinafter may be referred to simply as "tire") is a pneumatic tire structured to be mounted in a designated direction on a vehicle. The right side of tire 1 in FIG. 1 is set as the outer side when it is mounted on a vehicle. A tire of the present embodiment is asymmetrical at tire equator (C). Tire 1 of the present embodiment is preferred to be used for a passenger car, for example.

In tread 2 of tire 1, a pair of shoulder main grooves (3, 3) and center main groove 4 are formed.

A pair of shoulder main grooves (3, 3) is positioned one on each side of tire equator (C) and closest to tread footprint edge (Te), extending continuously in a tire circumferential direction. Shoulder main groove 3 of the present embodiment is formed in a straight line at a substantially constant groove width.

"Tread footprint edge (Te)" indicates the outermost position in a tire axial direction where the tread makes contact with the ground when tire 1, mounted on a rim using a normal rim (not shown), filled at normal inflation pressure and in normal conditions under no load, is set on a planar surface at a camber angle of 0 degrees when a normal load is applied.

The aforementioned "normal rim" indicates a rim regulated by a regulatory system that includes standards for the tire. For example, it is "Normal Rim" under JATMA regulations, "Design Rim" under TRA regulations, and "Measuring Rim" under ETRTO regulations.

The aforementioned "normal inflation pressure" means the air pressure regulated by a regulatory system that includes standards for the tire. For example, it is "Maximum Air Pressure" under JATMA regulations, maximum value described in the table "Tire Load Limits at Various Cold Inflation Pressures" under TRA regulations, and "Inflation Pressure" under ETRTO regulations.

The aforementioned "normal load" indicates a load regulated by a regulatory system that includes standards for the tire. For example, it is "Maximum Load Capacity" under JATMA regulations, maximum value described in the table "Tire Load Limits at Various Cold Inflation Pressures" under TRA regulations, and "Load Capacity" under ETRTO regulations.

Center main groove 4 extends continuously in a tire circumferential direction between shoulder main grooves (3, 3). In the present embodiment, there is only one center main groove 4, which is positioned on tire equator (C). In addition, center main groove 4 of the present embodiment is formed in a straight line having substantially a constant groove width. However, it is an option to provide two center main grooves 4.

Shoulder main groove 3 and center main groove 4 have a groove width set at 7 to 9% of tread footprint width (TW). Such shoulder main groove 3 and center main groove 4 effectively disperse a layer of water between the road surface and tread footprint (2s) during wet running. Accordingly, the wet performance of the tire is enhanced.

Width (TW) of the tread footprint is the distance between tread footprint edges (Te, Te) in a tire axial direction when tire 1 is in normal conditions and under no load.

When groove width (W1) of shoulder main groove 3 and groove width (W2) of center main groove 4 are smaller than 7% of tread footprint width (TW), wet performance may decline. On the other hand, when groove widths (W1) and (W2) are greater than 9% of tread footprint width (TW), the amount of air flowing in the grooves increases. Accordingly, noise performance may be lowered. Also, the rigidity of tire tread 2 decreases, and wear resistivity and cornering force may be lowered.

Figure 2:
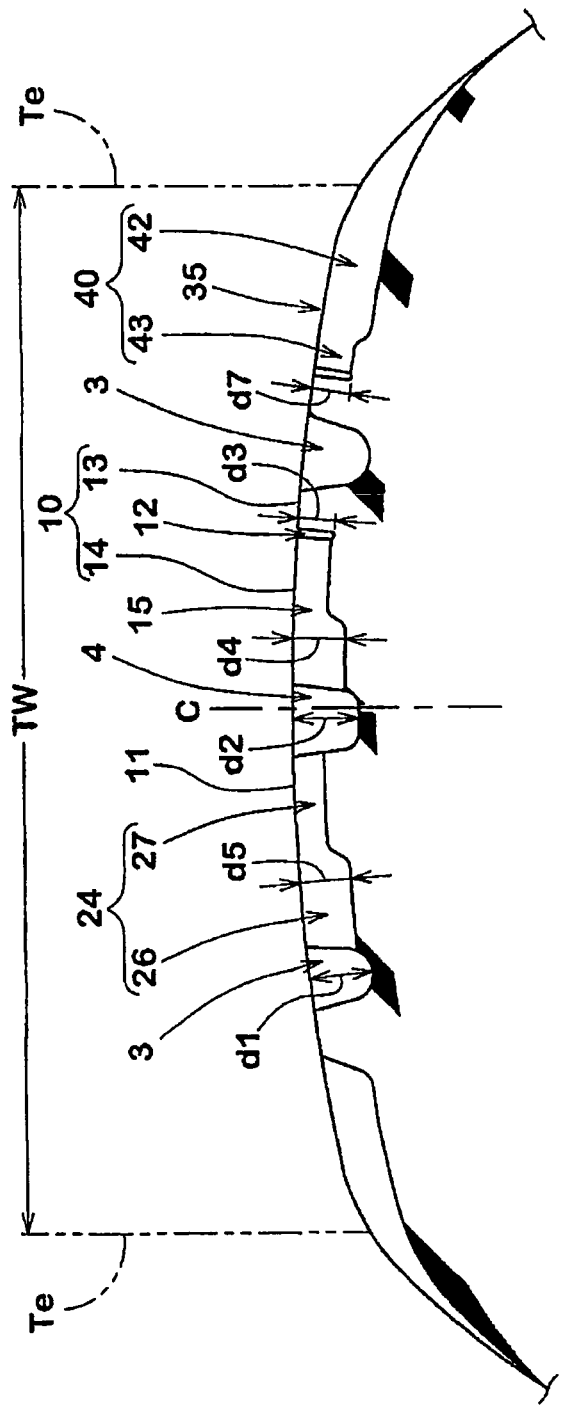
FIG. 2 is a cross-sectional view taken at "A-A" in FIG. 1.

FIG. 2 shows a cross-sectional view taken at "A-A" in FIG. 1. As shown in FIG. 2, depth (d1) of shoulder main groove 3 and depth (d2) of center main groove 4 are preferred to be 5~10 mm, for example.

As shown in FIG. 1, tire tread 2 is divided into a pair of middle land sections (5, 5) positioned respectively between shoulder main grooves (3, 3) and center main groove 4, and a pair of shoulder land sections (6, 6) positioned on their respective outer sides of shoulder main grooves (3, 3) in the tire axial direction.

Middle land sections 5 include outer middle land portion 10 positioned on the outer side of a vehicle from the tire equator (C) when the tire is mounted on a vehicle, and inner middle land portion 11 positioned on the inner side of a vehicle from the tire equator (C) when the tire is mounted on a vehicle.

Figure 3:
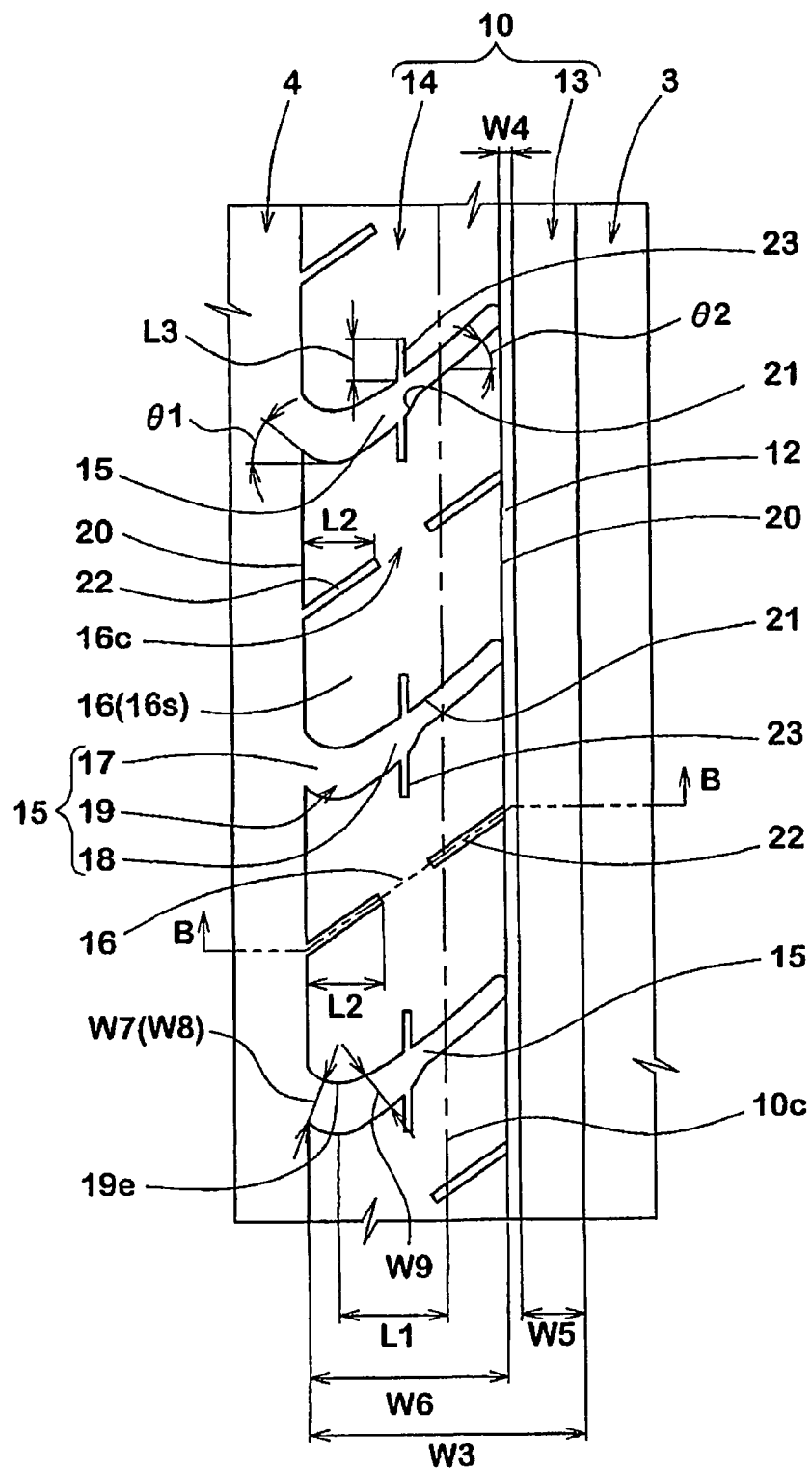
FIG. 3 is an enlarged view of an outer middle land portion in FIG. 1.

FIG. 3 is an enlarged view of outer middle land portion 10. Outer middle land portion 10 extends at a substantially constant width. Width (W3) of outer middle land portion 10 in the tire axial direction is preferred to be no smaller than 0.15 times, more preferably no smaller than 0.17 times, and to be no greater than 0.22 times, more preferably no greater than 0.20 times, the width (TW) of the tread footprint (shown in FIGS. 1 and 2, the same in the following). When width (W3) of outer middle land portion 10 is smaller than 0.15 times the width (TW) of the tread footprint, the rigidity of outer middle land portion 10 decreases, and the steering stability and cornering force may be lowered. On the other hand, when width (W3) of outer middle land portion 10 is greater than 0.22 times the width (TW) of the tread footprint, such a setting increases the area of the land portion in contact with the ground, and may decrease wet performance.

Outer middle land portion 10 is divided by middle narrow groove 12 into first outer middle land portion 13 on the outer side in the tire axial direction and second outer middle land portion 14 on the inner side in the tire axial direction.

Middle narrow groove 12 is formed in a straight line extending continuously in a tire circumferential direction. The groove width of middle narrow groove 12 is smaller than that of shoulder main groove 3 or center main groove 4.

Groove width (W4) of middle narrow groove 12 is preferred to be no smaller than 0.5 mm, more preferably no smaller than 0.8 mm, and to be no greater than 1.5 mm, more preferably no greater than 1.2 mm. When groove width (W4) of middle narrow groove 12 is smaller than 0.5 mm, wet performance may be lowered. On the other hand, when groove width (W4) of middle narrow groove 12 is greater than 1.5 mm, the rigidity of outer middle land portion 10 in the tire axial direction decreases, and the steering stability and cornering force may be lowered.

From the same viewpoints, groove width (d3) (shown in FIG. 2) of middle narrow groove 12 is preferred to be no smaller than 3.0 mm, more preferably no smaller than 3.5 mm, and to be no greater than 5.0 mm, more preferably no greater than 4.5 mm.

First outer middle land portion 13 is a rib extending continuously in a tire circumferential direction. First outer middle land portion 13 of the present embodiment extends in a straight line at a constant width.

Since first outer middle land portion 13 is a rib, it does not have a lateral groove connected to middle narrow groove 12 or to shoulder main groove 3. Therefore, first outer middle land portion 13 blocks air vibrations generated on the inner side of the vehicle and does not convey the vibrations to the outer side of the vehicle. Accordingly, the noise generated on the inner side of the vehicle relative to the outer middle land portion 10 is effectively blocked by middle narrow groove 12 and first outer middle land portion 13 so as not to be conveyed toward the outer side of the vehicle. As a result, noise performance is enhanced.

Width (W5) of first outer middle land portion 13 in the tire axial direction is preferred to be no smaller than 0.18 times, more preferably no smaller than 0.20 times, and to be no greater than 0.26 times, more preferably no greater than 0.24 times, the width (W3) of outer middle land portion 10 in the tire axial direction. When width (W5) of first outer middle land portion 13 is smaller than 0.18 times the width (W3) of outer middle land portion 10, the aforementioned effect of blocking noise may decrease. On the other hand, when width (W5) of first outer middle land portion 13 is greater than 0.26 times the width (W3) of outer middle land portion 10, the rigidity of the outer middle land portion 10 increases, and riding comfort may be lowered.

Second outer middle land portion 14 is made up of block rows divided by multiple outer middle lateral grooves 15. Second outer middle land portion 14 includes multiple second outer middle blocks 16. Second outer middle land portion 14 extends at a substantially constant width.

Width (W6) of second outer middle land portion 14 in the tire axial direction is preferred to be no smaller than 0.10 times, more preferably no smaller than 0.13 times, and to be no greater than 0.18 times, more preferably no greater than 0.15 times, the width (TW) of the tread footprint. When width (W6) of second outer middle land portion 14 is smaller than 0.10 times the width (TW) of the tread footprint, the rigidity of outer middle land portion 10 decreases, and steering stability may be lowered. On the other hand, when width (W6) of second outer middle land portion 14 is greater than 0.18 times the width (TW) of the tread footprint, the area of the outer middle land portion 10 in contact with the ground increases, and wet performance may be lowered.

Outer middle lateral grooves 15 connect center main groove 4 and middle narrow groove 12. Such outer middle lateral grooves enhance wet performance.

Groove width (W7) of outer middle lateral groove 15 gradually decreases from the center main groove 4 side toward the outer side in the tire axial direction. Also, as shown in FIG. 2, groove depth (d4) of outer middle lateral groove 15 gradually decreases from the center main groove 4 side toward the outer side in the tire axial direction. In the present embodiment, groove depth (d4) of outer middle lateral groove 15 gradually decreases in steps toward the outer side in the tire axial direction. Outer middle lateral groove 15 gradually increases the rigidity of second outer middle land portion 14 toward the outer side in the tire axial direction. Accordingly, the difference in rigidity decreases between second outer middle land portion 14 formed as block rows and first outer middle land portion 13 formed as a rib, and unbalanced wear in outer middle land portion 10 is suppressed.

As shown in FIG. 3, outer middle lateral groove 15 includes first portion 17 inclined with respect to the tire axial direction, second portion 18 having an opposite inclination to first portion 17, and connection portion 19 between those portions.

Outer middle lateral groove 15 changes its inclination direction at connection portion 19. Thus, connection portion 19 works as resistance against air flow. As a result, air flowing through center main groove 4 tends not to flow into outer middle lateral groove 15. Accordingly, columnar resonance noise in center main groove 4 is suppressed.

Connection portion 19 is positioned on the center main groove 4 side of the center point (10c) of outer middle land portion 10 in the tire axial direction. Thus, the distance is reduced between connection portion 19 and center main groove 4, and the air flowing into outer middle lateral groove 15 is even more effectively suppressed. Accordingly, noise performance is further enhanced.

Distance (L1) between connection portion 19 and center point (10c) of outer middle land portion 10 is preferred to be no smaller than 0.25 times, more preferably no smaller than 0.30 times, and to be no greater than 0.40 times, more preferably no greater than 0.35 times, the width (W3) of the outer middle land portion. When distance (L1) between connection portion 19 and center point (10c) is smaller than 0.25 times, first portion 17 becomes larger, and air may tend to flow into outer middle lateral groove 15. When distance (L1) between connection portion 19 and center point (10c) is greater than 0.45 times, second portion 18 is positioned too close to center main groove 4, and air may tend to flow from center main groove 4 into outer middle lateral groove 15.

In the present embodiment, groove edge (19e) of connection portion 19 is curved in an arc shape. Such connection portion 19 suppresses second outer middle block 16 from chipping. Also, such connection portion 19 reduces hammering sounds between groove edge (19e) of connection portion 19 and the road surface during dry running. Thus, noise performance is enhanced.

First portion 17 is connected to center main groove 4 and extends to connection portion 19. Angle (θ1) of first portion 17 with respect to the tire axial direction is preferred to be no smaller than 15 degrees, more preferably no smaller than 20 degrees, and to be no greater than 35 degrees, more preferably no greater than 30 degrees. When angle (θ1) of first portion 17 is smaller than 15 degrees, the air flowing into outer middle lateral groove 15 is not suppressed, and thus noise performance may decrease. On the other hand, when angle (θ1) of first portion 17 is greater than 35 degrees, second outer middle blocks 16 may wear unevenly and lower the wear resistivity of outer middle land portion 10.

Groove width (W8) of first portion 17 is preferred to be no smaller than 0.40 times, more preferably no smaller than 0.45 times, and to be no greater than 0.55 times, more preferably no greater than 0.50 times, the groove width (W2) of center main groove 4 (shown in FIG. 1). If groove width (W8) of first portion 17 is smaller than 0.40 times the groove width (W2) of center main groove 4, the groove volume of outer middle lateral groove 15 decreases, and wet performance may be lowered. On the other hand, if groove width (W8) of first portion 17 is greater than 0.55 times the groove width (W2) of center main groove 4, the columnar resonance noise in outer middle lateral groove 15 increases, and noise performance may be lowered.

Second portion 18 extends from connection portion 19 to middle narrow groove 12. Angle (θ2) of second portion 18 with respect to the tire axial direction is preferred to be no smaller than 30 degrees, more preferably no smaller than 33 degrees, and to be no greater than 40 degrees, more preferably no greater than 37 degrees. When angle (θ2) is smaller than 30 degrees, air tends to flow into outer middle lateral groove 15, and thus noise performance may decrease. On the other hand, if angle (θ2) is greater than 40 degrees, second outer middle block 16 may wear unevenly and lower the wear resistivity of outer middle land portion 10.

Groove width (W9) of second portion 18 is smaller than groove width (W8) of first portion 17. Groove width (W9) of second portion 18 gradually decreases toward the outer side in the tire axial direction. As so structured, second portion 18 effectively suppresses the air flow from center main groove 4. Also, second portion 18 gradually increases the rigidity of second outer middle land portion 14 toward the outer side in the tire axial direction. Such a setting reduces the rigidity difference with first outer middle land portion 13, thus suppressing uneven wear in the middle land section.

Groove width (W9) of second portion 18 is preferred to be no smaller than 0.28 times, more preferably no smaller than 0.34 times, and to be no greater than 0.40 times, more preferably no greater than 0.36 times, the groove width (W2) of center main groove 4. If groove width (W9) of second portion 18 is smaller than 0.28 times the groove width (W2) of center main groove 4, the groove volume of outer middle lateral groove 15 decreases, and wet performance may be lowered. On the other hand, if groove width (W9) of the second portion is greater than 0.40 times the groove width (W2) of the center main groove, the rigidity of the second outer middle land portion 14 decreases, and wear resistivity and cornering force may be lowered.

Second outer middle block 16 has contact patch (16s) in a substantially diamond shape. In second outer middle block 16, formed are: axial-direction sipe 22 which extends from tire circumferential-direction edge 20 toward the center (16c) of second outer middle block 16; and circumferential-direction sipe 23 that extends from tire axial-direction edge 21 toward center (16c) of second outer middle block 16.

Length (L3) of circumferential-direction sipe 23 is preferred to be shorter than length (L2) of axial-direction sipe 22. Such circumferential sipe 23 and axial-direction sipe 22 maintain the rigidity of middle land section 5 in the tire axial direction and enhance wet performance without reducing cornering force.

Figure 4:
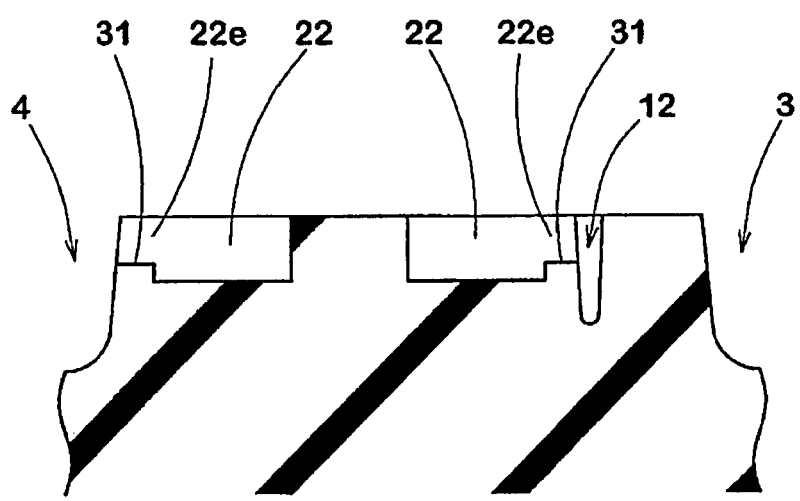
FIG. 4 is a cross-sectional view taken at "B-B" in FIG. 3.

FIG. 4 shows a cross-sectional view taken at "B-B" in FIG. 3. As shown in FIG. 4, axial-direction sipe 22 is preferred to have a raised portion 31 whose groove bottom surface is raised at edge (22e) which opens at center main groove 4 or at middle narrow groove 12. In so setting, the rigidity of outer middle land portion 10 increases, and steering stability and cornering force are enhanced.

Figure 5:
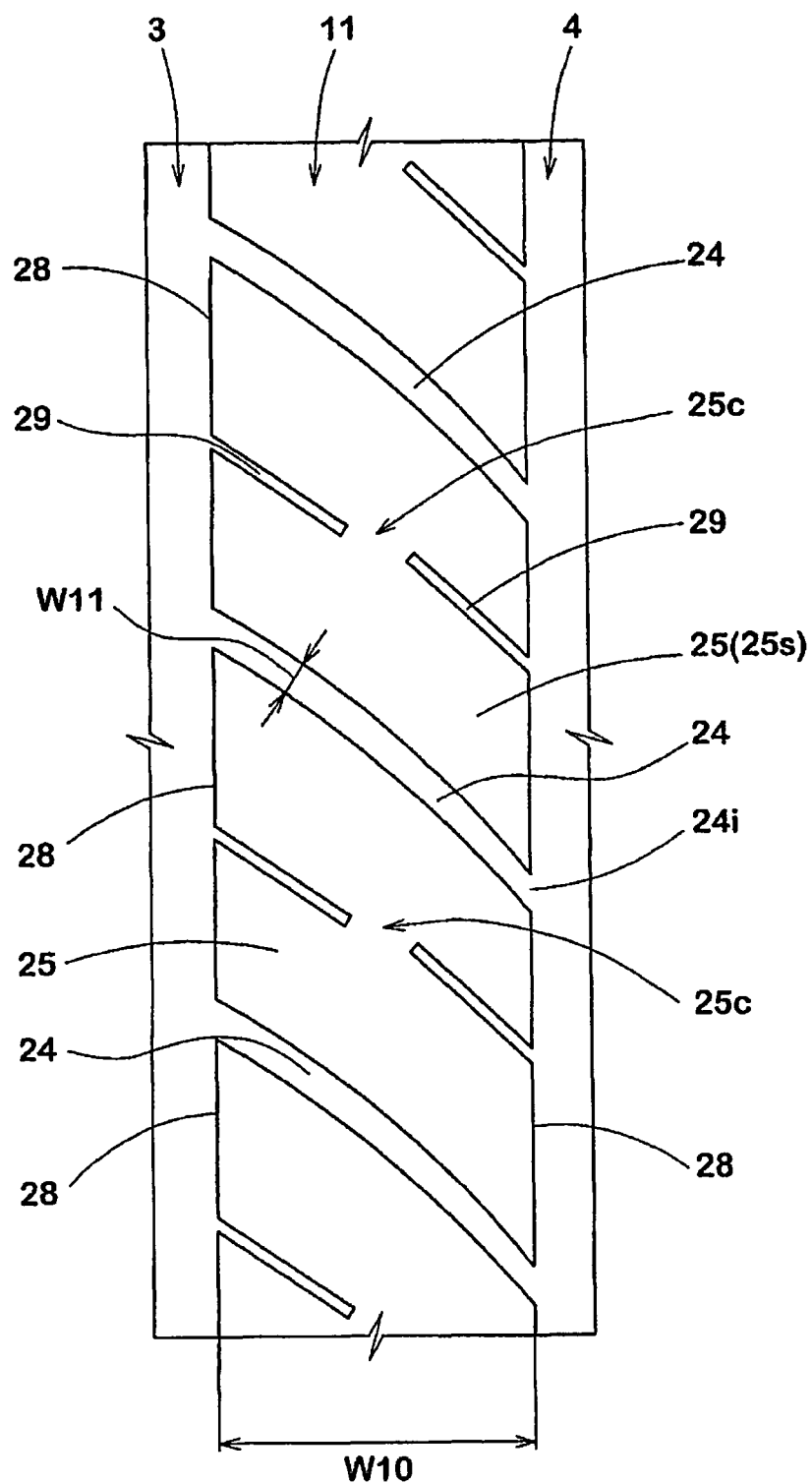
FIG. 5 is an enlarged view of an inner middle land portion in FIG. 1.

As shown in FIG. 5, inner middle land portion 11 is made up of block rows divided by multiple inner middle lateral grooves 24. At inner middle land portion 11, multiple inner middle blocks 25 are arrayed in a tire circumferential direction. Inner middle land portion 11 extends at a substantially constant width.

Width (W10) of inner middle land portion 11 in the tire axial direction is preferred to be no smaller than 0.15 times, more preferably no smaller than 0.17 times, and to be no greater than 0.22 times, more preferably no greater than 0.20 times, the width (TW) of the tread footprint. If width (W10) of inner middle land portion 11 is smaller than 0.15 times the width (TW) of the tread footprint, the rigidity of inner middle land portion 11 decreases, and wear resistivity and cornering force may be lowered. On the other hand, if width (W10) is greater than 0.22 times the width (TW) of the tread footprint, the area of the land section in contact with the ground increases and wet performance may be lowered.

Inner middle lateral groove 24 is connected to center main groove 4 and shoulder main groove 3. Inner middle lateral groove 24 is inclined with respect to the tire axial direction. Inner middle lateral groove 24 extends at a substantially constant groove width. Inner middle lateral groove 24 is curved in an arc shape. By so setting, inner middle lateral groove 29 exhibits edge effects which are well balanced in the tire axial direction and in a tire circumferential direction, and enhances wet performance.

When groove width (W11) of inner middle lateral groove 24 is smaller, wet performance may not be enhanced. On the other hand, if groove width (W11) of inner middle lateral groove 24 is greater, the rigidity of inner middle land portion 24 may decrease and cause a reduction in steering stability. Thus, groove width (W11) of inner middle lateral groove 24 is preferred to be no smaller than 2.0 mm, more preferably no smaller than 2.3 mm, and to be no greater than 3.0 mm, more preferably no greater than 2.7 mm.

As shown in FIG. 1, inner edge (24i) of inner middle lateral groove 24 is positioned to be shifted in the tire axial direction from inner edge (15i) of an outer middle lateral groove. By so setting, in such inner middle lateral groove 24, the hammering sounds generated when second outer middle block 16 touches the road surface hardly resonate with the hammering sounds generated when inner middle block 25 touches the road surface. Accordingly, noise performance is improved.

As shown in FIG. 2, inner middle lateral groove 24 includes first portion 26 and second portion 27, which is positioned on the inner side of first portion 26 in the tire axial direction and has a smaller groove depth than that of first portion 26. Groove depth (d5) of inner middle lateral groove 24 gradually decreases in steps toward the inner side in the tire axial direction. Such inner middle lateral groove 24 increases the rigidity of inner middle land portion 11 toward the outer side of the vehicle. Thus, the rigidity difference with outer middle land portion 10 is reduced, and uneven wear in the middle land section is suppressed.

As shown in FIG. 5, inner middle block 25 has a contact patch (25s) in a substantially diamond shape. In inner middle block 25, axial-direction sipe 29 extends from tire circumferential-direction edge 28 toward center (25c) of inner middle block 25. Such inner middle block 25 enhances wet performance without reducing the rigidity of inner middle land portion 11 in the tire axial direction.

The formation of axial-direction sipe 29 ends within inner middle block 25. Such axial-direction sipe 29 disperses water better while maintaining the rigidity of inner middle block 25. Accordingly, wear resistivity and cornering force are maintained and wet performance is enhanced.

As shown in FIG. 1, shoulder land section 6 includes outer shoulder land portion 35 positioned on the outer side of a vehicle and inner shoulder land portion 36 positioned on the inner side of the vehicle when the tire is mounted on the vehicle.

Figure 6:
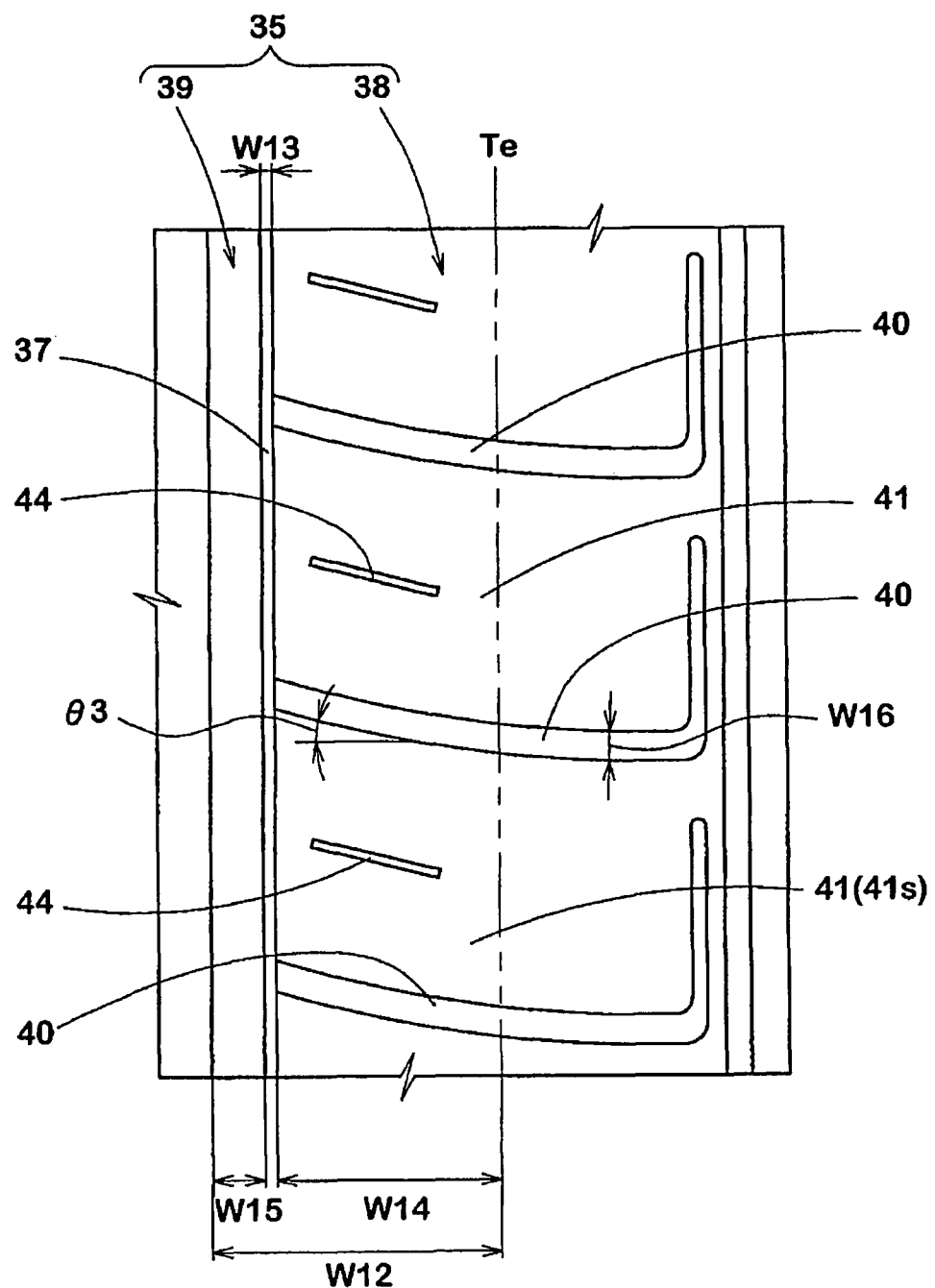
FIG. 6 is an enlarged view of an outer shoulder land portion in FIG. 1.

FIG. 6 is an enlarged view of outer shoulder land portion 35. Outer shoulder land portion 35 extends at a substantially constant width. Width (W12) of outer shoulder land portion 35 in the tire axial direction is preferred to be no smaller than 0.17 times, more preferably no smaller than 0.20 times, and to be no greater than 0.28 times, more preferably no greater than 0.25 times, the width (TW) of the tread footprint. If width (W12) of outer shoulder land portion 35 is smaller than 0.17 times the width (TW) of the tread footprint, the rigidity of outer shoulder land portion 35 decreases and wear resistivity and cornering force may be lowered. On the other hand, if width (W12) of outer shoulder land portion 35 is greater than 0.28 times the width (TW) of the tread footprint, such a setting increases the area of outer shoulder land portion 35 in contact with the ground and may lower wet performance.

Outer shoulder land portion 35 is divided into first outer shoulder land portion 38 on the outer side of the tire in the tire axial direction and second outer shoulder land portion 39 on the inner side of the tire in the tire axial direction by shoulder narrow groove 37.

Shoulder narrow groove 37 is formed in a straight line extending continuously in a tire circumferential direction. Shoulder narrow groove 37 has a narrower groove than shoulder main groove 3 or center main groove 4 (shown in FIG. 1).

Groove width (W13) of shoulder narrow groove 37 is preferred to be no smaller than 0.5 mm, more preferably no smaller than 0.8 mm, and to be no greater than 1.5 mm, more preferably no greater than 1.2 mm. When groove width (W13) of shoulder narrow groove 37 is smaller than 0.5 mm, wet performance may decrease, while the rigidity of outer middle land portion 10 is increased, likely reducing riding comfort. On the other hand, when groove width (W13) of shoulder narrow groove 37 is greater than 1.5 mm, the rigidity of outer middle land portion 10 in the tire axial direction decreases, likely causing a reduction in steering stability and cornering force.

From the same viewpoint, groove depth (d7) of shoulder narrow groove 37 (shown in FIG. 2), is preferred to be no smaller than 3.0 mm, more preferably no smaller than 3.5 mm, and to be no greater than 5.0 mm, more preferably no greater than 4.5 mm.

First outer shoulder land portion 38 is formed with block rows divided by multiple outer shoulder lateral grooves 40. First outer shoulder land portion 38 includes multiple first outer shoulder blocks 41. First outer shoulder land portion 38 extends at a substantially constant width.

Width (W14) of first outer shoulder land portion 38 in the tire axial direction is preferred to be no smaller than 0.13 times, more preferably no smaller than 0.15 times, and to be no greater than 0.22 times, more preferably no greater than 0.20 times, the width (TW) of the tread footprint. When width (W14) of first outer shoulder land portion 38 is smaller than 0.13 times the width (TW) of the tread footprint, the rigidity of first outer shoulder land portion 38 decreases, and wear resistivity and cornering force may be lowered. On the other hand, when width (W14) of first outer shoulder land portion 38 is greater than 0.22 times the width (TW) of the tread footprint, wet performance and wandering performance may decrease.

Outer shoulder lateral groove 40 is connected to shoulder narrow groove 37 and extends beyond the tread edge (Te) toward the outer side in the tire axial direction. Outer shoulder lateral groove 40 is curved in an arc shape. Such outer shoulder lateral groove 40 enhances wet performance and wandering performance.

Outer shoulder lateral groove 40 is inclined with respect to the tire axial direction. Angle (θ3) of outer shoulder lateral groove 40 with respect to the tire axial direction is preferred to be no smaller than 5 degrees, more preferably no smaller than 8 degrees, and to be no greater than 15 degrees, more preferably no greater than 12 degrees. Such outer shoulder lateral groove 40 exhibits edge effects in the tire axial direction as well, and enhances steering stability during wet running.

Outer shoulder lateral groove 40 extends at a substantially constant width. Groove width (W16) of outer shoulder lateral groove 40 is preferred to be no smaller than 2.0 mm, more preferably no smaller than 2.5 mm, and to be no greater than 4.0 mm, more preferably no greater than 3.5 mm. When the groove width (W16) of outer shoulder lateral groove 40 is smaller than 2.0 mm, wet performance and wandering performance may be lowered. On the other hand, when groove width (W16) of outer shoulder lateral groove 40 is greater than 4.0 mm, steering stability may decrease.

As shown in FIG. 2, outer shoulder lateral groove 40 includes first portion 42 and second portion 43, which is positioned on the inner side of first portion 42 in the tire axial direction and has a smaller groove depth than that of first portion 42. Such outer shoulder lateral groove 40 gradually increases the rigidity of outer shoulder land portion 35 from the inner side toward the outer side in the tire axial direction. As a result, such a setting decreases the rigidity difference with the outer middle land portion 10, thus suppressing uneven wear and enhancing wandering performance.

As shown in FIG. 6, first outer shoulder block 41 includes contact patch (41s) in a substantially rectangular shape. In first outer shoulder block 41, closed sipe 44 is formed in such a way that both of its ends are closed within the block. Such first outer shoulder block 41 enhances wet performance while maintaining steering stability and cornering force during dry running.

Second outer shoulder land portion 39 is a rib extending continuously in a tire circumferential direction. Second outer shoulder land portion 39 of the present embodiment extends in a straight line at a constant width. Such second outer shoulder land portion 39, along with first outer middle land portion 13, does not convey air vibrations generated on the inner side of a vehicle to the outer side of the vehicle. Accordingly, noise performance is improved.

As shown in FIG. 6, width (W15) of second outer shoulder land portion 39 in the tire axial direction is preferred to be no smaller than 3.5%, more preferably no smaller than 4.0%, and to be no greater than 5.0%, more preferably no greater than 4.5%, of the width (TW) of the tread footprint. When width (W15) of second outer shoulder land portion 39 is smaller than 3.5% of width (TW) of the tread footprint, the aforementioned effects of blocking noise may decrease. On the other hand, when width (W15) of second outer shoulder land portion 39 is greater than 5.0% of the width (TW) of the tread footprint, such a setting increases the rigidity of outer shoulder land portion 35 and may cause riding comfort to decrease.

Figure 7:
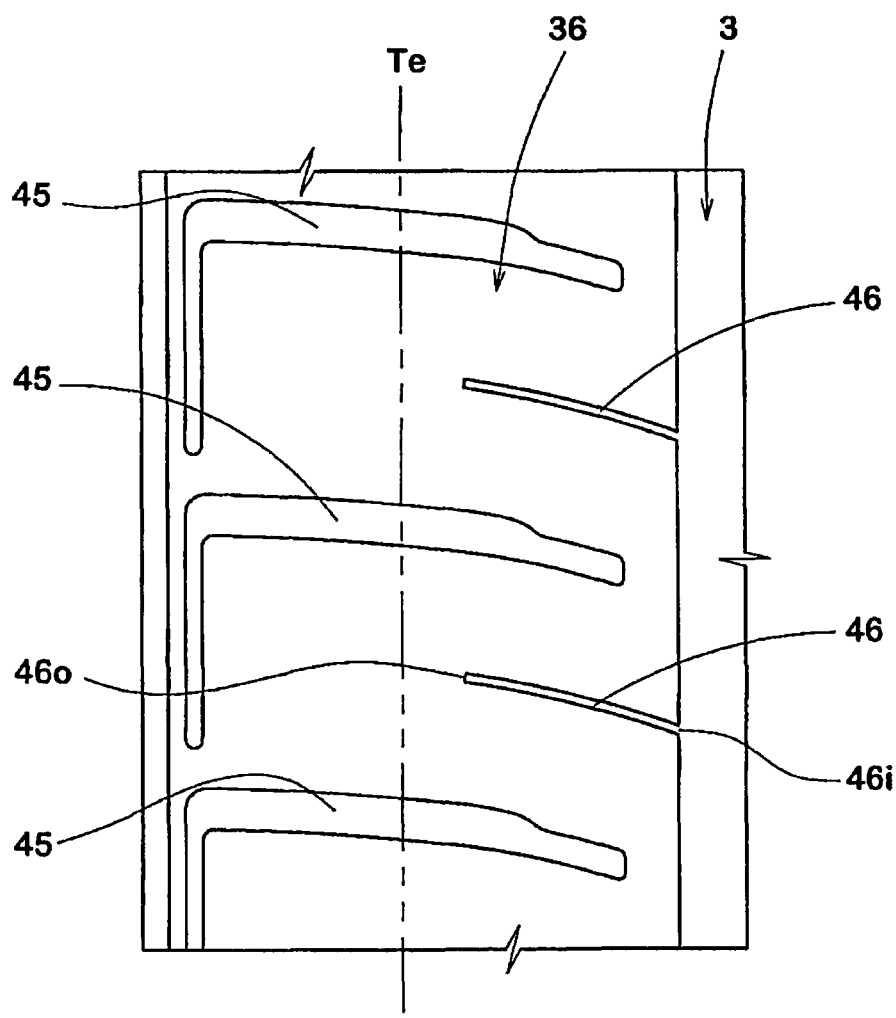
FIG. 7 is an enlarged view of an inner shoulder land portion in FIG. 1.

FIG. 7 shows an enlarged view of inner shoulder land portion 36. As shown in FIG. 7, inner shoulder land portion 36 is a rib extending continuously in a tire circumferential direction. In inner shoulder land portion 36, shoulder lug groove 45 and shoulder sipe 46 are alternately formed in a tire circumferential direction. Such inner shoulder land portion 36 enhances wet performance while maintaining steering stability.

Shoulder lug groove 45 extends from a point outside tread footprint edge (Te) toward the inner side of the tire in the tire axial direction. Also, the formation of shoulder lug groove 45 ends within inner shoulder land portion 36. Such shoulder lug groove 45 enhances wet performance and wandering performance while maintaining the wear resistivity of inner shoulder land portion 36.

One end (46i) of shoulder sipe 46 is connected to shoulder main groove 3 and the other end (46o) ends within inner shoulder land portion 36. Such shoulder sipe 46 enhances wet performance without excessively reducing the rigidity of inner shoulder land portion 36.

So far, a pneumatic tire according to an embodiment of the present invention has been described in detail. However, the present invention is not limited to the above embodiment, and various modifications of the embodiment may apply.

EXAMPLES

Test pneumatic tires were prepared with a size of 165/70R14 having base patterns as shown in FIG. 1 according to the specifications shown in Table 1. For each of the prepared test tires, wet performance, noise performance, wear resistivity and cornering force were evaluated. The common specifications of each tire are as follows.
  mounted rim: 14×5J
  tire inflation pressure: 230 kPa
  test vehicle: national brand FF passenger car with an emission of 1300 cc
  tire mounting positions: on all axles Wet Performance The test vehicle entered the test course below while increasing speed in steps. The lateral acceleration (lateral G) at the front tires of the test vehicle was measured and the average lateral G of the front tires at a speed of 55~80 km/h was calculated. The evaluation results are shown in indices based on a value obtained in Example 1 and set as 100. The greater the number, the higher the indication of excellence in wet performance.
  test course: circuit track with a radius of 100 m
  road surface: standing water, 6 meters long and 6 millimeters deep, was prepared on the road surface.

Noise Performance

Noise inside the vehicle was measured while the test vehicle was driven at 50 km/h on a dry asphalt surface. The interior noise was measured using a microphone set at the driver's seat headrest position. The results were evaluated by using the inverse number of noise loudness (db). The evaluation results are shown in indices based on a value obtained in Example 1 and set as 100. The greater the number, the better the noise performance.

Wear Resistivity

The amount of wear was measured after the test vehicle ran 3000 km on local roads. The results were evaluated by using the inverse number of the wear amount. The evaluation results are shown in indices based on a value obtained in Example 1 and set as 100. The greater the number, the better the wear resistivity.

Cornering Force

Using indoor testing equipment, the cornering force of each test tire was measured under the following conditions. The evaluation results are shown in indices based on the cornering force obtained in Example 1 and set as 100. The greater the number, the better the result.

mounted rim: 14×5J
tire inflation pressure: 230 kPa
slip angle: 12 degrees
vertical load: 4.35 kN
speed: 10 km/h
The test results are shown in Table 1.

TABLE 1

|  | comparative example 1 | comparative example 2 | comparative example 3 | comparative example 4 | comparative example 5 | example 1 | example 2 | comparative example 6 | example 3 |
|---|---|---|---|---|---|---|---|---|---|
| groove width (W1) of shoulder main groove/tread footprint width (TW) (%) | 4.0 | 10.0 | 4.0 | 4.0 | 5.0 | 7.0 | 9.0 | 11.0 | 7.0 |
| groove width (W2) of center main groove/tread footprint width (TW) (%) | 4.0 | 10.0 | 4.0 | 4.0 | 5.0 | 7.0 | 9.0 | 11.0 | 7.0 |
| 1st outer middle land portion (rib) exists? | no | no | yes | yes | yes | yes | yes | yes | yes |
| width (W5) of 1st outer middle land portion/width (W3) of outer middle land portion | — | — | — | — | 0.22 | 0.22 | 0.22 | 0.22 | 0.22 |
| connection portion exists? | no | no | no | yes | yes | yes | yes | yes | yes |
| distance (L1) from center to connection portion/width (W3) of outer middle land portion | — | — | — | −0.20 (✗) | 0.38 | 0.38 | 0.38 | 0.38 | 0.38 |
| 2nd outer shoulder land portion (rib) exists? | no | no | no | no | yes | yes | yes | yes | no |
| wet performance (index) | 92 | 110 | 90 | 90 | 93 | 100 | 105 | 111 | 102 |
| noise performance (index) | 90 | 86 | 93 | 95 | 95 | 100 | 99 | 91 | 97 |
| wear resistivity (index) | 90 | 86 | 92 | 91 | 95 | 100 | 98 | 91 | 98 |
| cornering force (index) | 90 | 86 | 92 | 92 | 95 | 100 | 98 | 92 | 98 |

|  | example 4 | example 5 | example 6 | example 7 | example 8 | example 9 | example 10 | example 11 |
|---|---|---|---|---|---|---|---|---|
| groove width (W1) of shoulder main groove/tread footprint width (TW) (%) | 7.0 | 7.0 | 7.0 | 7.0 | 7.0 | 7.0 | 7.0 | 7.0 |
| groove width (W2) of center main groove/tread footprint width (TW) (%) | 7.0 | 7.0 | 7.0 | 7.0 | 7.0 | 7.0 | 7.0 | 7.0 |
| 1st outer middle land portion (rib) exists? | yes | yes | yes | yes | yes | yes | yes | yes |
| width (W5) of 1st outer middle land portion/width (W3) of outer middle land portion | 0.18 | 0.20 | 0.24 | 0.26 | 0.22 | 0.22 | 0.22 | 0.22 |
| connection portion exists? | yes | yes | yes | yes | yes | yes | yes | yes |
| distance (L1) from center to connection portion/width (W3) of outer middle land portion | 0.38 | 0.38 | 0.38 | 0.38 | 0.25 | 0.30 | 0.35 | 0.40 |
| 2nd outer shoulder land portion (rib) exists? | yes | yes | yes | yes | yes | yes | yes | yes |
| wet performance (index) | 100 | 100 | 100 | 100 | 100 | 100 | 100 | 100 |
| noise performance (index) | 100 | 100 | 100 | 100 | 98 | 99 | 100 | 100 |
| wear resistivity (index) | 98 | 99 | 100 | 100 | 101 | 101 | 100 | 99 |
| cornering force (index) | 100 | 100 | 100 | 100 | 100 | 100 | 100 | 100 |

(✗) When the value of distance (L1) is negative, it indicates that the connection portion is positioned on the shoulder main groove side of the center point of the outer middle land portion.

According to test results, it was confirmed that noise performance was enhanced in the pneumatic tires of the Examples while wet performance was maintained.

In the tread of a pneumatic tire, a main groove extends continuously in a tire circumferential direction. Such a main groove enhances the wet performance of the tire.

However, a main groove causes undesired noise (mainly columnar resonance noise) during running, thus lowering the noise performance of the tire. Especially, when lateral grooves extend in a tire axial direction to the main groove, even louder columnar resonance noise is generated at the main groove.

A pneumatic tire according to an embodiment of the present invention has enhanced wet performance and noise performance by specifically designing the groove width of a main groove and by improving the shapes of a middle land section and a middle lateral groove.

According to one aspect of the present invention, the tread of a pneumatic tire includes a pair of shoulder main grooves extending continuously in the tire circumferential direction, positioned one on each side of a tire equator in the tread footprint, and a center main groove extending continuously in the tire circumferential direction between the shoulder main grooves. By so setting those grooves, the tread is divided into a pair of middle land sections positioned respectively between the pair of shoulder main grooves and the center main groove, and the direction of the tire to be mounted on a vehicle is designated specifically. The shoulder main grooves and center main groove have a groove width set at 7 to 9% of the width of the tread footprint; the middle land section includes an outer middle land portion positioned on the outer side of a vehicle from the tire equator when the tire is mounted on the vehicle; by a middle narrow groove extending continuously in the tire circumferential direction and having a groove width smaller than that of the shoulder main groove, the outer middle land portion is divided into a first outer middle land portion on the outer side in the tire axial direction and a second outer middle land portion on the inner side in the tire axial direction; the first outer middle land portion is a rib extending continuously in the tire circumferential direction; the second outer middle land portion is provided with multiple outer middle lateral grooves connected to the center main groove and middle narrow groove; the outer middle lateral grooves each include a first portion that has an inclination to the tire axial direction, a second portion that has an opposite inclination to the first portion, and a connection portion between those portions; and the connection portion is positioned on the center main groove side of the center point of the outer middle land portion in the tire axial direction.

According to another aspect of the present invention, a pneumatic tire may have the groove width and groove depth of the outer middle lateral grooves gradually decrease toward the outer side in the tire axial direction.

According to yet another aspect of the present invention, a pneumatic tire may have the tread which has a shoulder land section positioned on the outer side of the shoulder main groove in the tire axial direction; the shoulder land section includes an outer shoulder land portion positioned on the outer side of a vehicle when the tire is mounted on the vehicle; the outer shoulder land portion is divided into a first outer shoulder land portion on the outer side in the tire axial direction and a second outer shoulder land portion on the inner side in the tire axial direction by a shoulder narrow groove extending continuously in a tire circumferential direction with a groove width smaller than that of the shoulder main groove; and the second outer shoulder land portion is a rib extending continuously in a tire circumferential direction.

According to still another aspect of the present invention, a pneumatic tire may have the middle land section which includes an inner middle land portion positioned on the inner side of a vehicle from the tire equator when the tire is mounted on the vehicle; the inner middle land portion is provided with inner middle lateral grooves that are connected to the shoulder main groove and the center main groove; and the inner middle lateral grooves are inclined at 30~50 degrees with respect to the tire axial direction.

According to still another aspect of the present invention, a pneumatic tire may have the inner edge of the inner middle lateral groove which is positioned to be shifted in the tire axial direction from the inner edge of the outer middle lateral groove.

According to still another aspect of the present invention, a pneumatic tire may have the middle narrow groove which has a groove width of 0.5~1.5 mm.

According to another aspect of the present invention, a pneumatic tire may have only one center main groove that is positioned on the tire equator.

A pneumatic tire according to an embodiment of the present invention is structured in such a way that a shoulder main groove and a center main groove have a groove width set at 7 to 9% of the tread footprint width. Such a shoulder main groove and a center main groove effectively disperse a layer of water between the road surface and the tread footprint during wet running. Accordingly, wet performance of the tire is enhanced.

The middle land section according to an embodiment of the present invention includes an outer middle land portion positioned on the outer side of a vehicle from the tire equator when the tire is mounted on the vehicle. The outer middle land portion is divided into a first outer middle land portion on the outer side in the tire axial direction and a second outer middle land portion on the inner side in the tire axial direction by a middle narrow groove extending continuously in a tire circumferential direction with a smaller groove width than that of the shoulder main groove. The first outer middle land portion is a rib extending continuously in a tire circumferential direction.

The noise generated on the inner side of the vehicle relative to the outer middle land portion is effectively blocked by the middle narrow groove and the first outer middle land portion extending continuously in a tire circumferential direction so as not to be conveyed to the outer side of the vehicle. Accordingly, noise performance is improved.

In the second outer middle land portion, multiple outer middle lateral grooves are formed to connect the center main groove and the middle narrow groove. Such outer middle lateral grooves enhance wet performance.

The outer middle lateral grooves each include a first portion that has an inclination with respect to the tire axial direction, a second portion that has an opposite inclination to the first portion, and a connection portion between the first and second portions. Namely, the inclination directions of a groove change at the connection portion. Accordingly, the air is suppressed from flowing into the outer middle lateral grooves as the connection portion causes resistance, thus suppressing the columnar resonance noise in the center main groove. Moreover, the connection portion is positioned on the center main groove side of the center point of the outer middle land portion in the tire axial direction. Therefore, the distance is reduced between the connection portion and the center main groove so as to even more effectively suppress the air from flowing into the outer middle lateral grooves. As a result, noise performance is further enhanced.

Obviously, numerous modifications and variations of the present invention are possible in light of the above teachings. It is therefore to be understood that within the scope of the appended claims, the invention may be practiced otherwise than as specifically described herein.

What is claimed is:

1. A pneumatic tire, comprising:
a tread having a center main groove and a pair of shoulder main grooves, the shoulder main grooves extending continuously in a tire circumferential direction such that the shoulder main grooves are positioned one on each side of a tire equator in a tread footprint, respectively, the center main groove extending continuously in the tire circumferential direction between the shoulder main grooves,
wherein the tread has a pair of middle land sections formed between the center main groove and the pair of shoulder main grooves such that the middle land sections are positioned between the shoulder main grooves and the center main groove, respectively, each of the shoulder main grooves and center main groove has a groove width set in a range of 7 to 9% of a width of the tread footprint, the middle land sections include an outer middle land portion divided by a middle narrow groove into a first outer middle land portion on an outer side in a tire axial direction with respect to a vehicle when the pneumatic tire is mounted on the vehicle and a second outer middle land portion on an inner side in the tire axial direction with respect to the vehicle, the middle narrow groove is extending continuously in the tire circumferential direction and has a groove width smaller than the groove width of each of the shoulder main grooves, the first outer middle land portion forms a rib extending continuously in the tire circumferential direction, the second outer middle land portion has a plurality of outer middle lateral grooves each connected to the center main groove and the middle narrow groove, each of the outer middle lateral grooves includes a first portion having an inclination to the tire axial direction, a second portion having an opposite inclination to the inclination of the first portion, and a connection portion between the first portion and the second portion, and the connection portion is positioned on a center main groove side with respect to a center point of the outer middle land portion in the tire axial direction.

2. The pneumatic tire according to claim 1, wherein each of the outer middle lateral grooves has a groove width and a groove depth which gradually decrease toward the outer side in the tire axial direction.

3. The pneumatic tire according to claim 1, wherein the tread has a plurality of shoulder land sections positioned on outer sides of the shoulder main grooves in the tire axial direction, respectively, the shoulder land sections include an outer shoulder land portion positioned on the outer side with respect to the vehicle, and the outer shoulder land portion is divided into a first outer shoulder land portion on the outer side in the tire axial direction with respect to the vehicle and a second outer shoulder land portion on the inner side in the tire axial direction with respect to the vehicle by a shoulder narrow groove extending continuously in the tire circumferential direction and having a groove width smaller than the groove width of each of the shoulder main grooves such that the second outer shoulder land portion forms a rib extending continuously in the tire circumferential direction.

4. The pneumatic tire according to claim 2, wherein the tread has a plurality of shoulder land sections positioned on outer sides of the shoulder main grooves in the tire axial direction, respectively, the shoulder land sections include an outer shoulder land portion positioned on the outer side with respect to the vehicle, and the outer shoulder land portion is divided into a first outer shoulder land portion on the outer side in the tire axial direction with respect to the vehicle and a second outer shoulder land portion on the inner side in the tire axial direction with respect to the vehicle by a shoulder narrow groove extending continuously in the tire circumferential direction and having a groove width smaller than the groove width of each of the shoulder main grooves such that the second outer shoulder land portion forms a rib extending continuously in the tire circumferential direction.

5. The pneumatic tire according to claim 1, wherein the middle land sections include an inner middle land portion positioned on the inner side from the tire equator with respect to the vehicle, the inner middle land portion has a plurality of inner middle lateral grooves connected to the center main groove and the shoulder main groove on the inner side from the tire equator such that the inner middle lateral grooves are inclined at 30~50 degrees with respect to the tire axial direction.

6. The pneumatic tire according to claim 2, wherein the middle land sections include an inner middle land portion positioned on the inner side from the tire equator with respect to the vehicle, the inner middle land portion has a plurality of inner middle lateral grooves connected to the center main groove and the shoulder main groove on the inner side from the tire equator such that the inner middle lateral grooves are inclined at 30~50 degrees with respect to the tire axial direction.

7. The pneumatic tire according to claim 3, wherein the middle land sections include an inner middle land portion positioned on the inner side from the tire equator with respect to the vehicle, the inner middle land portion has a plurality of inner middle lateral grooves connected to the center main groove and the shoulder main groove on the inner side from the tire equator such that the inner middle lateral grooves are inclined at 30~50 degrees with respect to the tire axial direction.

8. The pneumatic tire according to claim 4, wherein the middle land sections include an inner middle land portion positioned on the inner side from the tire equator with respect to the vehicle, the inner middle land portion has a plurality of inner middle lateral grooves connected to the center main groove and the shoulder main groove on the inner side from the tire equator such that the inner middle lateral grooves are inclined at 30~50 degrees with respect to the tire axial direction.

9. The pneumatic tire according to claim 5, wherein the inner middle lateral grooves in the inner middle land portion have inner edges shifted in the tire axial direction from inner edges of outer middle lateral grooves in the outer middle land portion.

10. The pneumatic tire according to claim 6, wherein the inner middle lateral grooves in the inner middle land portion have inner edges shifted in the tire axial direction from inner edges of outer middle lateral grooves in the outer middle land portion.

11. The pneumatic tire according to claim 7, wherein the inner middle lateral grooves in the inner middle land portion have inner edges shifted in the tire axial direction from inner edges of outer middle lateral grooves in the outer middle land portion.

12. The pneumatic tire according to claim 8, wherein the inner middle lateral grooves in the inner middle land portion have inner edges shifted in the tire axial direction from inner edges of outer middle lateral grooves in the outer middle land portion.

13. The pneumatic tire according to claim 1, wherein the groove width of the middle narrow groove is set in a range of 0.5~1.5 mm.

14. The pneumatic tire according to claim 2, wherein the groove width of the middle narrow groove is set in a range of 0.5~1.5 mm.

15. The pneumatic tire according to claim 3, wherein the groove width of the middle narrow groove is set in a range of 0.5~1.5 mm.

16. The pneumatic tire according to claim 5, wherein the groove width of the middle narrow groove is set in a range of 0.5~1.5 mm.

17. The pneumatic tire according to claim 1, wherein the center main groove is a single center main groove positioned on the tire equator.

18. The pneumatic tire according to claim 2, wherein the center main groove is a single center main groove positioned on the tire equator.

19. The pneumatic tire according to claim 3, wherein the center main groove is a single center main groove positioned on the tire equator.

20. The pneumatic tire according to claim 1, wherein the pair of shoulder main grooves is formed one on each side of the tire equator closest to a respective edge of the tread footprint.

* * * * *